United States Patent [19]
Dromgoole et al.

[11] Patent Number: 5,385,745
[45] Date of Patent: Jan. 31, 1995

[54] PROCESS FOR FORMING, STORING, BAKING AND VENDING FRESH BAKED FOOD PRODUCTS

[76] Inventors: James A. Dromgoole; Kenneth H. Hall; Robert Noga, all of 7847 Dunbrook Rd., Ste. C & D, San Diego, Calif. 92126

[21] Appl. No.: 189,560

[22] Filed: Jan. 26, 1994

Related U.S. Application Data

[62] Division of Ser. No. 833,157, Feb. 10, 1992, Pat. No. 5,309,824.

[51] Int. Cl.6 .............................................. A21D 8/00
[52] U.S. Cl. .................................. 426/392; 426/496; 426/523
[58] Field of Search ............... 426/392, 496, 503, 504, 426/512, 523, 665; 99/326, 353, 355, 357, 387, 443 C, 450.1; 53/122, 157, 540; 221/150 A, 150 R, 150 HC

[56] References Cited

U.S. PATENT DOCUMENTS

| | | | |
|---|---|---|---|
| 3,340,789 | 9/1967 | Simjian | 99/352 |
| 3,520,249 | 7/1970 | Miller, Jr. | 99/357 |
| 3,534,676 | 10/1970 | Rubino | 99/355 |
| 3,651,752 | 3/1972 | Rostonski | 221/150 HC |
| 4,540,588 | 9/1985 | Bartfield | 426/523 |
| 4,944,218 | 7/1990 | Cresson | 99/450.4 |
| 4,979,435 | 12/1990 | Hayashi et al. | 99/353 |
| 4,997,664 | 3/1991 | Williams | 426/392 |
| 5,016,528 | 5/1991 | Chen | 99/443 C |
| 5,113,754 | 5/1992 | Robinson et al. | 99/326 |
| 5,144,879 | 9/1992 | Alessi | 99/357 |
| 5,163,356 | 11/1992 | Chigira | 99/484 |
| 5,168,795 | 12/1992 | Okada | 221/150 A |

*Primary Examiner*—George Yeung
*Attorney, Agent, or Firm*—Frank D. Gilliam; John R. Duncan

[57] ABSTRACT

A method and apparatus for mixing and forming dough into plural discrete product units on a carrier and storing the ready to bake product, and a vending method and apparatus for separating the product from the carrier, baking the product and delivering the product, such as cookies or the like, to a customer. The mixed dough is formed into units, typically disk-like, and placed in a pattern on one or more first carrier sheets, then second carriers are applied with the product laminated between the sheets. The sheets and product can be fan-folded into containers, such as conventional boxes, which can be stored until needed. The containers are placed in a vending machine which leads the sheet assemblies to a station where the carrier sheets are removed and the product is dropped onto a surface that is moved through a convection oven for baking, then through a cooling station. The selected number of product units is dropped into a serving tray and presented to the customer. Typically, each baking cycle is initiated by the deposit of a selected amount of money into vending machine and the purchaser is notified that the freshly baked product is ready by a buzzer or the like.

8 Claims, 3 Drawing Sheets

PROCESS FOR FORMING, STORING, BAKING AND VENDING FRESH BAKED FOOD PRODUCTS

This is a divisional of copending application Ser. No. 07/833,157 filed on Feb. 10, 1992, now U.S. Pat. No. 5,309,824.

BACKGROUND OF THE INVENTION

This invention relates in general to the baking and vending of a food product and, more specifically, to a system for preparing preformed, uncooked dough product units, storing them, baking them as needed and delivering them to a purchaser in a vending machine.

A very wide variety of products are provided to consumers through vending machines. These range from soft drinks and prepackaged food products to various non-edible items. Prepared, packaged, candy, cookies and other snack items are generally vented at room temperature and contain preservatives and the like to prevent spoilage. Food items that are preferably eaten warm, such as pizza or hamburger sandwiches, are generally vended in a refrigerated state to protect against spoilage, with a nearby microwave oven provided so that the consumer can heat the items. While generally acceptable, these items do not have the desirable, fresh-baked or freshly cooked flavor and absence of preservatives that most consumers prefer.

Many attempts have been made to provide vending machines that cook, or at least heat, food products being vended. Typical of these is the sandwich heating and vending device disclosed my Rostonski in U.S. Pat. No. 3,651,752, which uses an electrical current passed through the packaged sandwich to heat the sandwich by resistance heating. Rubino describes a vending machine in Pat. No. 3,534,676 that passes a prepackaged meal through a microwave oven just prior to vending. The machine of Miller as described in U.S. Pat. No. 3,520,249 toasts buns by passing them past a heater just prior to vending. A complex apparatus cooking a hamburger patty and inserting it between two halves of a bun is described by Cresson in U.S. Pat. No. 4,944,218. Foods sealed packets are heated and dispensed from the packets in The apparatus described by Simjian in U.S. Pat. No. 3,340,789.

While having varying effectiveness in cooking or heating and dispensing various different types of food, all of these devices and vending methods are complex, require many sequential operations and would have difficulty maintaining sanitary conditions throughout there process. None shows an entire system for preparing the packaged food product in a way that permits simple and rapid cooking and vending. The prior art systems are not optimized for the baking of dough based products, such as cookies.

Thus, despite the great number of vending machines that have been developed, there remains a continuing need for improved methods and apparatus for packaging, storing, baking and dispensing food products in plural individual product units, in a simple, sanitary and efficient manner.

SUMMARY OF THE INVENTION

It is, therefore, an object of this invention to provide a system for vending dough based food products that overcomes the above-noted problems. Another object is to provide a method and apparatus for producing a package of ready to bake and vend dough based food product formed in discrete units. A further object is to provide a simple and efficient method and apparatus for removing packaging from dough based food product units, baking and delivering the product to the consumer in a fresh, hot condition. Yet another object is to provide a baking and vending method and apparatus that easily maintains sanitary conditions throughout the food handling process.

The above objects, and others, are accomplished in accordance with this invention by a method and apparatus which basically comprises the steps of mixing dough, forming product units on a carrier sheet system, storing the assembly of sheets and dough units in a container, placing the container in a vending machine, striping the carrier system from the products, baking the products, cooling them to the desired temperature and delivering them to the consumer. Various timers, switches, controls, coin operated quantity selection devices, etc. as are well known in the vending machine art are used to control the sequence of steps.

In more detail, the preparation of the product for placement in the vending machine comprises the steps of mixing a selected dough, forming the dough into a plurality of product units such as individual cookie preforms, placing the units in seriatim on one or more parallel first carrier sheets, placing a second carrier sheet over the dough product units on each first sheet in a sandwich or laminated configuration, leading a selected length of said sheet or parallel sheets into a shipping and storage container, where the sheets are preferably arranged in fan-folded layers, and transversely cutting the sheets when the desired amount is in the container, The containers can then be moved to storage for later used or moved directly to vending machines. The containers are preferably refrigerated during shipment and storage.

The vending machine includes an insulated box, usually refrigerated, for receiving one of the storage containers. When a container is installed in the vending machine, the leading edge of the carrier is fed to a stripping device that removes both first and second sheets and allows the product units to fall onto a movable belt. The belt moves the dough product units through a convection oven at a rate and temperature selected to optimally bake the selected dough. When the product units exit the oven, they are cooled to a selected delivery temperature and dispensed from the moving belt into a tray which is then presented to the consumer.

The consumer selects the number of dough product units separated from the carrier sheets, baked and dispensed by inserting a selected amount of money into the vending machine and selected which of several product variations desired, where different dough having different ingredients is placed on different parallel sheet and product unit assemblies. Thus, the product is baked only on demand, so that is always warm and extremely fresh when dispensed.

BRIEF DESCRIPTION OF THE DRAWINGS

Details of the invention, and of certain preferred embodiments thereof, will be further understood upon reference to the drawing, wherein.

DETAILED DESCRIPTION OF PREFERRED EMBODIMENTS

Figure 1:
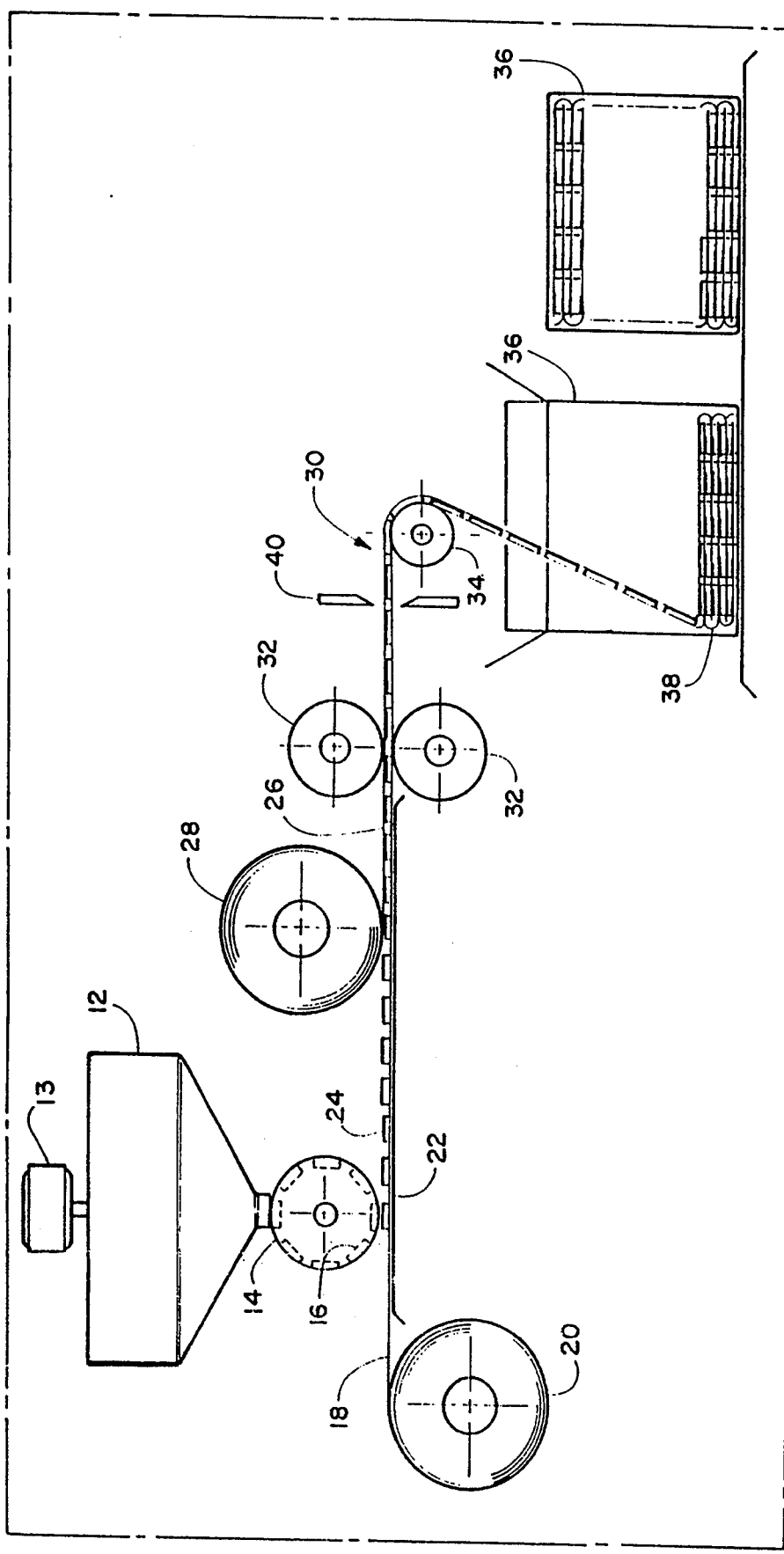
FIG. 1 is a schematic side elevation view of the apparatus for forming dough product units, adding a carrier and storing the units.

Referring now to FIG. 1, there is seen a schematic representation of the dough product preparation apparatus Dough ingredients are placed in hopper 12 and mixed in a conventional manner by a mixer 13. Any suitable dough may be used. While the optimum product prepared by the method and apparatus of this invention is cookies, other similar dough products ordinarily sold and consumed in small, discrete units, such as crackers or the like, may also be made and dispensed. A mold wheel 14 having a plurality of peripheral mold pockets 16 rotates adjacent to hopper 12 so that dough fills pockets 16. Pockets 16 have any shape and size appropriate to the product being made.

A first carrier sheet 18, or preferably several parallel first sheets, is fed from a feed roll 20 across a table 22. Sheets 18 may be formed from any suitable material. Waxed paper inexpensive and generally effective. Other materials, such as plastic films or Teflon fluorocarbon coated paper, may be used where suitable.

As sheet 18 is passed under wheel 14, individual dough product units 24 are dropped from pockets 16 onto the sheet. Pockets 16 may be coated with a release agent, or internal plungers (not shown) could be used within wheel 14 to aid in release of the dough from the pockets if desired, although the force of gravity is the only means ordinarily necessary.

A second carrier sheet 26 is fed from supply roll 28 into contact with the upper surfaces of the product units. The resulting laminated sheet assembly 30 is passed through the nip between rollers 32 which size product units 24 to a selected thickness and assure that sheets 18 and 26 are releaseably bonded to product units 24 sufficiently to withstand subsequent handling operations.

Laminated sheets 30 are then fed over roller 34 into storage box 36 where they are fan-folded into multiple layers. The folds 38 preferably fall in the spaces between adjacent product units. An operator may manually assist in assuring proper filling of the boxes if desired. Once box 36 is filled with the selected length of laminated sheet assemblies 30, a conventional cutter 40 is operated to sever the sheets, preferably between product units. The filled box 36 is removed and replaced with an empty box 36 and the process continues.

Filled boxes 36 generally are stored and shipped under refrigeration. When needed, they are taken to and installed in vending machines. The stored food product preforms could also be sold in smaller boxes for home use where the product units would be manually separated from the carrier sheets and baked on suitable pans in a conventional oven.

Figure 2:
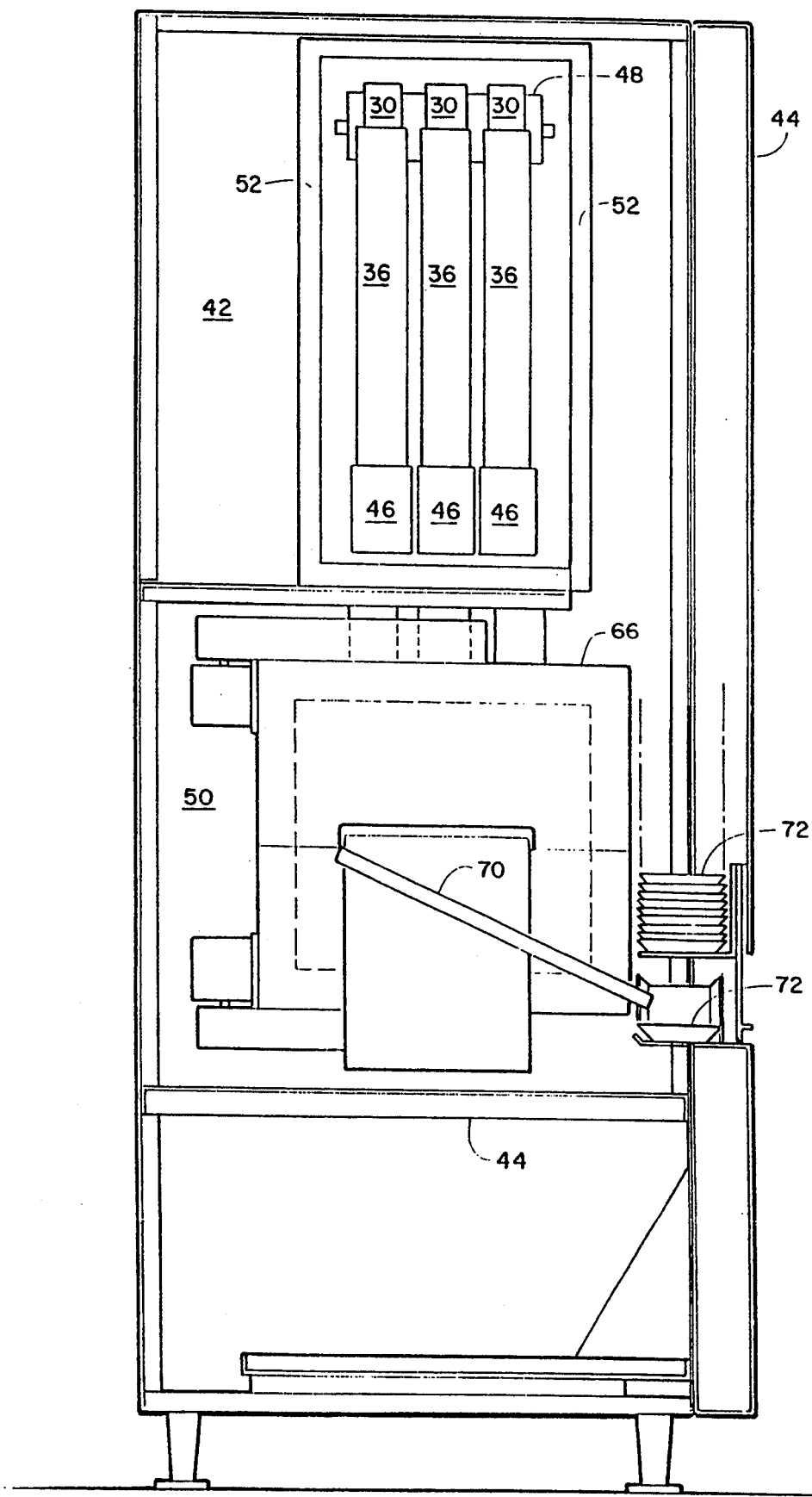
FIG. 2 is a schematic side elevation view of the apparatus for baking and vending the dough product units.
Figure 3:
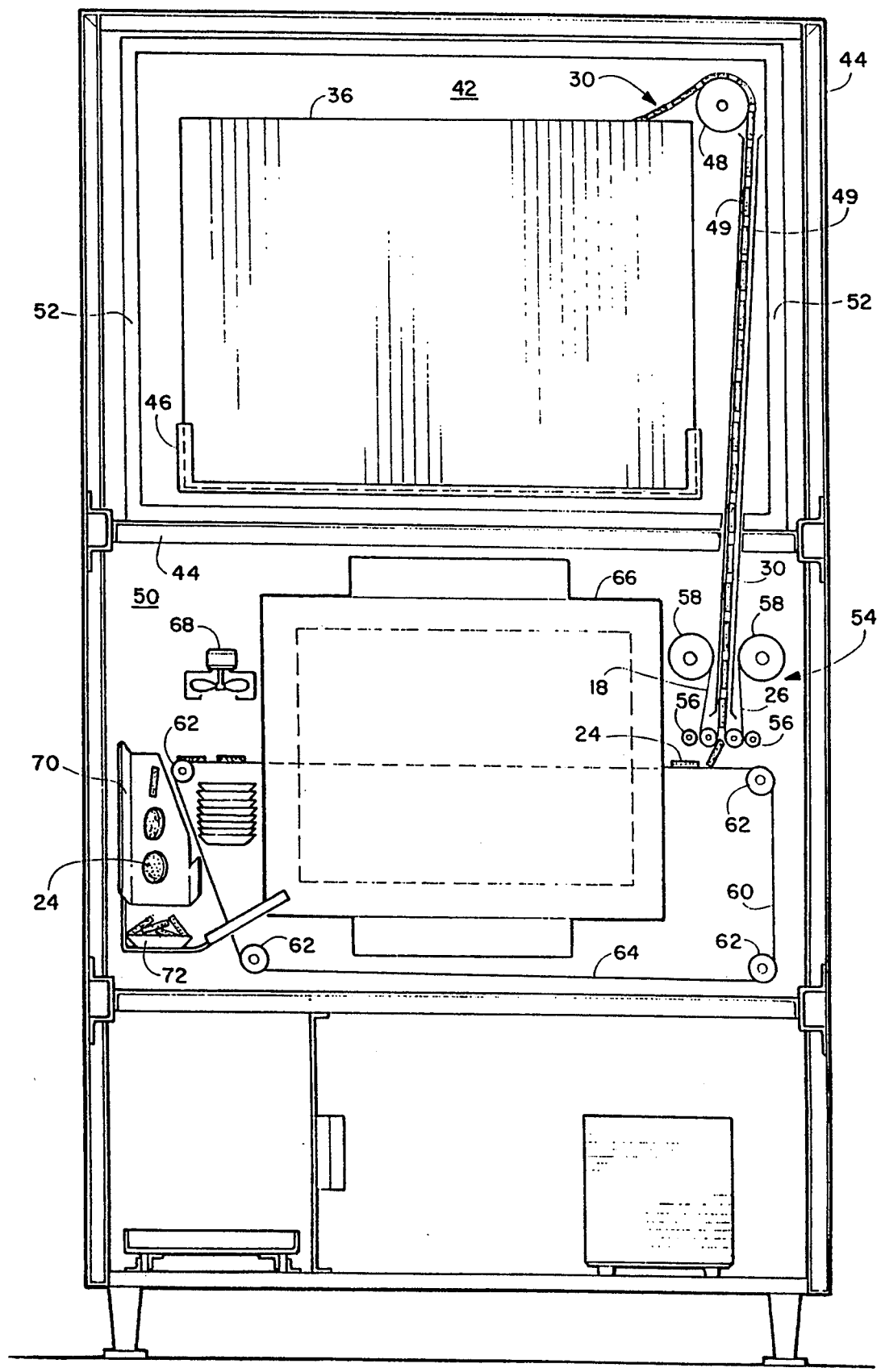
FIG. 3 is a schematic front elevation view of the apparatus of FIG. 2.

A typical vending machine in accordance with this invention is shown in schematic representation in FIGS. 2 and 3, with outside covers removed for convenience of illustration. The vending machine includes a frame 44 supporting the internal components and to which a housing (not shown) is secured.

In an upper compartment 42, at the top of frame 44, supports 46 are provided for receiving a filled box 36. Laminated sheet assembly 30 is fed out of the top of box 36, over a roller 48 and down through a guide channel 49 into a lower compartment 50. Upper compartment 42 is preferably refrigerated within insulation 52 to preserve the product dough and protect it from heat generated in Lower compartment 50.

After laminated sheet assembly 30 enters lower compartment 50 it passes through a sheet stripping assembly 54 which includes a pair of small diameter rollers 56 on each side of assembly 54. Each sheet passes between the roller making up one pair, then to powered take-up rollers 58. Rollers 56 preferably have small diameters, typically in the one eight to one quarter inch range, so that the direction of movement of sheets 18 and 26 is sharply reversed to quickly pull the sheet away from the dough product units 24 and allow them to fall onto a moving endless belt 60 entrained around rollers 62.

Belt 60 is preferably endless as shown, although a belt extending from a feed roller to a take-up roller could be used if desired. Belt 60 may be made from any suitable material, such as TEFLON mesh, stainless mesh, or any suitable high temperature material. If desired, conventional cleaning wipers, brushes or the like (not shown) could be used adjacent to the lower run 64 of belt 60 to remove any crumbs or the like. If a disposable, single use belt is selected, the belt could be formed from conventional single parchment baking paper or the like.

Moving belt 60 carries the dough product units 24 through a convection oven 66 where the dough is baked. The speed of belt 60 and the temperature of oven 66 may be varied depending upon baking characteristics of the selected dough. The convection oven is strongly preferred over other heating means, such as radiant bean arrangements, microwave ovens or the like because of its speed of baking together with its ability to properly brown the upper surface of baked products, such as cookies.

When the product units 24 exit oven 66, they are preferably cooled to a selected temperature by blowers 68 directing cool air against them. The products then fall from the end of belt 60 into a chute through which they slide into a tray 72 to be picked up by the customer. Trays are fed from a stack 72 (FIG. 2) by conventional feed means.

As seen in FIG. 2, three (or more if desired) parallel aminated sheet and dough assemblies 30 are provided. Different product dough mixtures may be provided in each row, so that a customer can select any of the three different products, with only the selected assembly moving. Alternatively, if only a single product is being dispensed, single, wider, upper and lower sheet assemblies could be used with plural rows of similar dough product units on each sheet assembly.

Any suitable conventional system can be used to permit a customer to select the desired product, insert appropriate coins, receive change, etc. A buzzer or the like may be used to signal completion of the baking cycle and indicate that the product tray 72 is ready for removal.

In a typical cookie vending machine, the cookie product units laminated between sheets 18 and 26 may have diameters of about 1.75 inches, placed on the sheets with a center-to-center spacing about 2.25 and may have thicknesses of about 0.1875 inch. storage boxes 36 may have an internal length of about 28 inches and an internal height of about 18 inches, so that each row of cookies may have 12 cookies per layer and 83 layers or a total of 996 cookies per row. Different rows may contain dough for the same different cookies.

While certain preferred arrangements and configurations were described in the above description of preferred embodiment, those may be varied, where suitable with similar results. Other applications, variations and ramifications of this invention will occur to those skilled in the art upon reading this disclosure. Those are intended to be included within the scope of this invention, as defined in the appended claims.

We claim:

1. The process of preparing, storing, baking and delivering a plurality of food product units which comprises the steps of:

mixing a dough comprising ingredients selected to produce a desired product upon baking;

continuously forming said dough into a plurality of product units onto at least one first carrier sheet;

bringing a second carrier sheet into contact with said product units in a laminated relationship with said product units between said sheets;

placing a selected length of the resulting laminated sheets into a shipping container;

transversely cutting said sheets when a selected quantity of product units are in said container;

placing said container in a vending machine;

feeding the cut end of said sheets from said container to stripping means where a selected length of said sheets is removed from a selected number of said product units;

allowing said product units to fall onto a conveyor belt as said sheets are removed;

conveying said product units through a convection oven;

retaining said product units in said oven at a selected temperature for a time sufficient to bake said product units to the desired degree;

cooling the baked product units to a desired temperature as said conveyor moves said baked product units beyond said oven; and moving the resulting baked product units to a delivery area.

2. The process according to claim 1 further including refrigerating said product container after it is filled and while it is in the vending machine.

3. The process according to claim 1 including the steps of mixing different dough from different ingredients and depositing product units of correspondingly different composition onto plural parallel first carrier strips.

4. The process according to claim 1 wherein said dough product units are formed by filling surface pockets in a rotatable wheel with said dough to form the desired configuration of said product units and moving said units from said pockets to said first carrier sheet.

5. The process according to claim 1 wherein said carrier sheets are stripped from said dough product units by pulling said sheets away from said dough product units around small diameter rollers.

6. The process according to claim 1 wherein said baked product units moved to said delivery area by causing said baked product units to fall from said conveyor belt into a chute and positioning a tray to receive the baked product units from said chute.

7. The process according to claim 1 including the further step, after. application of said second carrier sheet, of passing the laminated assembly of sheets and dough product units through the nip between two rollers to assure bonding of sheets to dough and make the thickness of the assembly uniform.

8. The process according to claim 1 wherein said baked product units are cooled by blowing cool air over them.

* * * * *